March 3, 1959  G. M. MARKS  2,875,616
SAFETY CUT-OFF VALVE
Filed July 19, 1957

INVENTOR.
GEORGE MARKS
BY

United States Patent Office 2,875,616
Patented Mar. 3, 1959

2,875,616

SAFETY CUT-OFF VALVE

George M. Marks, Greenville, S. C., assignor to Industrial Heat Engineering Company, a partnership of South Carolina Application July 19, 1957, Serial No. 673,024

4 Claims. (Cl. 74—2)

This invention relates in general to electric safety valves for controlling the flow of liquids and gases in conduit and more particularly to an actuator adapted to close a valve upon the failure of electric power and subject to manual re-opening only when electric power is restored.

Similar valve actuators previous to this invention utilized complicated critical latching means which are expensive to manufacture, subject to failure, and in some devices the manual restoring means may be operated without electric power and thus defeat the safety features provided.

A principal object of the invention is the provision of a foolproof safety valve actuator adapted to hold a valve connected thereto in open position when electrically energized and adapted to automatically close said valve and stop the flow of gas of liquid in a conduit in which it connected upon the failure of electric power.

Another object of the invention is the provision of a safety valve actuator normally holding a valve means in open position by electro magnetic means and adapted to automatically operate and close said valve means upon the failure of electric power including manual means for resetting said actuator and valve to its open position effective only when the electric power is restored.

A further object of the invention is the provision of a solenoid operated safety valve actuator including means for preventing the manual restoration thereof until a predetermined minimum voltage is applied to the device.

These and other objects in one embodiment of the invention are described and shown in the appended specification and drawings in which.

Figure 1:
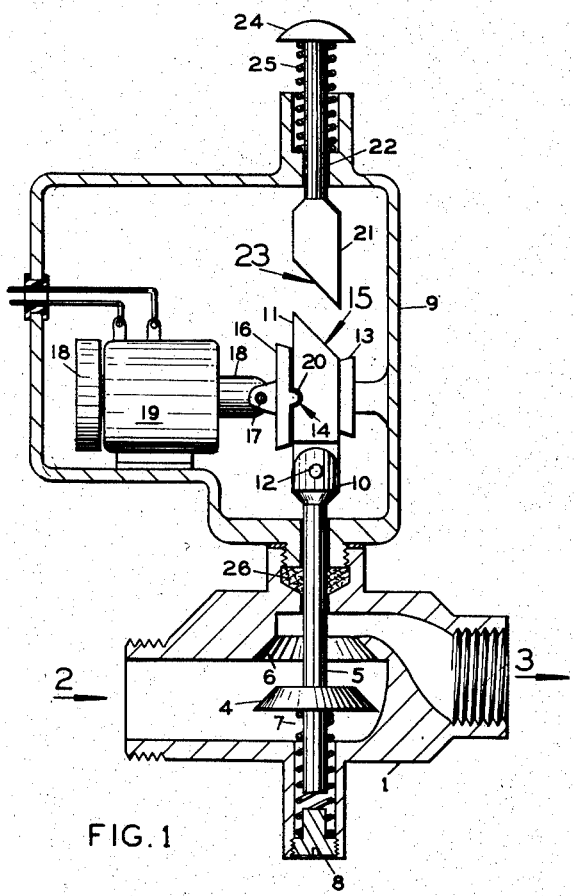
Fig. 1 is a cross sectional elevation of the valve with elements in normal open operating position.

Referring to Fig. 1, valve body 1 having an inlet 2 and outlet 3 is intended to be connected in a conduit through which the flow of gas or liquid is to be controlled. A conventional poppet valve 4 having stem 5 is adapted to reciprocate in the body 1 to engage and disengage from seat 6 when operated. The valve is normally urged toward its closed position by compression spring 7 retained by screw 8.

It is to be understood that other types of valves such as gate valves are equally suitable for this application.

Figure 2:
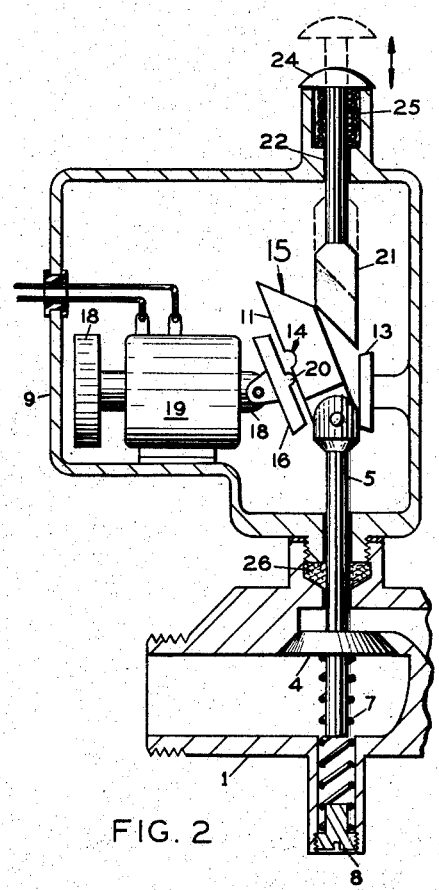
Fig. 2 is the same as Fig. 1 except elements in closed position.
Figure 3:
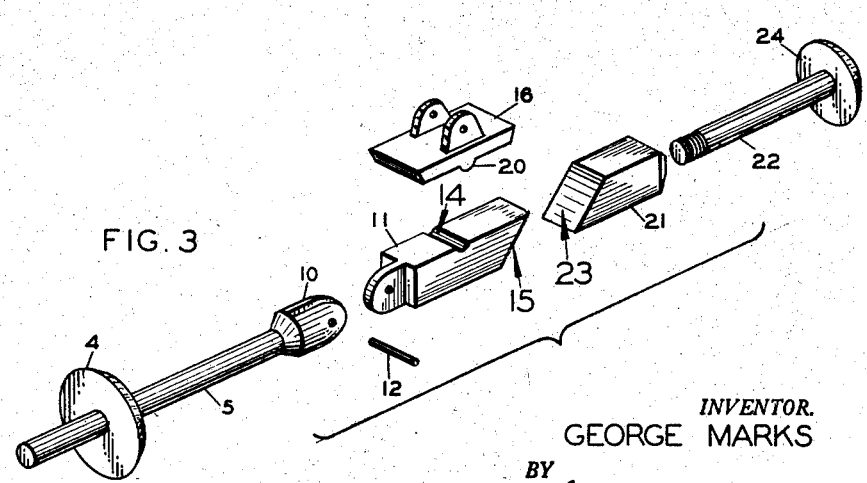
Fig. 3 is a perspective exploded view of movable elements shown in Figs. 1 and 2.

Referring to Figs. 1 and 2, housing 9 retains all of the working elements and is normally provided with a sealed cover to prevent tampering.

The upper end of the stem 5 terminates in a yoke 10 to which is pivotally secured a latch member 11 by pin 12. A stationary guide plate 13 is secured to housing 9 as a guide for the latch member 11. The latch is provided with a transverse groove 14 and terminates in an oblique surface 15 at its upper end. A shoe 16 is pivotally secured by pin 17 to the outer end of plunger 18 of a push type solenoid 19 which is secured to the housing 9 as shown. The outer planar surface of the shoe 16 has integral therewith a cylindrical projection 20 laterally disposed and normally in engagement with groove 14 in the latch. Spring means not shown within the solenoid 19 normally urges locking engagement of the shoe 16 with the latch 11 as shown in Fig. 1. A restore plunger 21 having a stem 22 is journalled for reciprocation in the upper side of housing 9 and provided with an oblique lower surface 23 for engagement with surface 15 of latch 11. The upper end of the stem terminates in a manual pushbutton 24 which also serves as a bearing for spring 25 which normally urges the plunger into its upper position as shown in Fig. 1.

A conventional seal 26 is provided in the housing of the valve to seal the stem thereof to prevent leakage.

In operation and under the assumption that the solenoid 19, Fig. 1, is energized, all the elements are shown in their operating position which will permit gas or fluid to flow through the valve body 1 in the direction shown by arrows.

In the event that the electric power, which normally energized solenoid 19, is momentarily interrupted, then the solenoid plunger 18 will retract and permit disengagement of the shoe 16 from the latch 11 thus permitting spring 7 in the valve to move the stem 5 upward and thus close the valve and stop the flow therethrough.

Should an attempt be made to manually restore the device and open the valve when solenoid 19 is not energized, the restoration action will be defeated by virtue of the free downward movement of the plunger 21 which would merely tilt the latch 11 laterally without moving stem 5 in a downward direction.

When the electric power is restored and solenoid 19 is re-energized, then the shoe 16 will move laterally and push the latch against the guide plate 13. Then the downward manual movement of plunger 21, because of the mating contact of surfaces 23 and 15, the valve will be opened and remain in open position by virtue of the engagement of projection 20 with the groove 14 in the latch. The operating plunger 21 will then return to its normal inoperative position by virtue of spring 25 illustrated in dotted lines, Fig. 2.

It is important to note that since the pull of the plunger in any solenoid is proportional to the voltage applied thereto, a particular solenoid and a particular choice of the angle of contact between the surfaces 15 and 23 with respect to the vertical axis of the valve stem can be made whereby manual restoration of the valve will not take place until a predetermined voltage is applied to the solenoid. Although the solenoid may operate at a voltage lower than maximum, the plunger will not hold the latch with sufficient force to overcome the lateral component of force applied to the plunger 21 resulting in the tilting of latch 11 until proper predetermined voltage is applied to the solenoid which will permit the opening of the valve.

Having described my invention, I claim.

1. An actuator for controlling a valve means in a conduit conducting liquid or gas comprising means forming a housing, a control member journalled for reciprocation in said housing and adapted for movement from a first position to a second position, spring means urging said control member toward said second position, a latch member in said housing pivotally secured for oscillation on said control member, a guide member for frictionally supporting said latch member by one side thereof for movement co-linear with said control member, an electric solenoid means including a normally retracted plunger having a lock shoe pivotally secured thereon, said shoe adapted for locking engagement with said latch member when the latter is positioned against said guide by said plunger and the said control member is in said first position and said solenoid means is energized whereby said shoe will release said latch and permit said spring means to move said control member to said second position when said solenoid means is de-energized.

2. An actuator for controlling a valve means in a conduit conducting liquid or gas comprising means forming a housing, a control member journalled for reciprocation in said housing and adapted for movement from a first position to a second position, spring means urging said control member toward said second position, a latch member in said housing pivotally secured for oscillation on said control member, said latch member having a cam surface oblique to its principal axis, a guide member for supporting said latch member by one side thereof for movement co-linear with said control member when the latter is rotated to normal position, an electric solenoid means including a normally retracted plunger having a lock shoe pivotally secured thereon, said shoe adapted for locking engagement with said latch member when the latter is positioned against said guide by said plunger and the said control means is in said first position and said solenoid means is energized, a restore member journalled for movement through said housing and adapted for manual operation, said restore member having an oblique cam surface positioned and adapted to engage said first mentioned cam surface for manually moving said latch member into latching engagement with sad shoe and concurrently moving said control member to said first position when said solenoid means is energized.

3. An actuator for controlling a valve means in a conduit conducting liquid or gas comprising means forming a housing, a control member journalled for reciprocation in said housing and adapted for movement from a first position to a second position, spring means urging said control member toward said second position, a latch member in said housing pivotally secured for oscillation on said control member, said latch member having a lateral groove in one side thereof and an oblique surface at one end thereof, a guide member for supporting said latch member by the side opposite said groove for movement co-linear with said control member when said latch member is rotated to normal position, an electric solenoid means including a normally retracted plunger having a lock shoe pivotally secured thereon, said shoe having a transverse projection thereon adapted for locking engagement with said groove in said latch member when the latter is positioned against said guide by said plunger and the said control member is in said first position and said solenoid means is energized whereby said control means will be held in said first position against the restraining action of said spring means when said solenoid is energized.

4. An actuator for controlling a valve means in a conduit conducting liquid or gas comprising means forming a housing, a control member journalled for reciprocation in said housing and adapted for movement from a first position to a second position, spring means urging said control member toward said second position, a latch member in said housing pivotally secured for oscillation on said control member, said latch member having a lateral groove in one side thereof and an oblique surface at one end thereof, a guide member for supporting said latch member by the side opposite said groove for movement co-linear with said control member when the latter is rotated to normal position, an electric solenoid means including a normally retracted plunger having a lock shoe pivotally secured thereon, said shoe having a transverse projection thereon adapted for locking engagement with said groove in said latch member when the latter is positioned against said guide by said plunger and the said control member is in said first position and said solenoid means is energized, a restore plunger journalled for reciprocation through said housing and adapted for manual operation, said restore plunger having oblique cam surface positioned and adapted to engage said first mentioned cam surface for manually moving said control member to said first position when said latch member is rotated into the path of said plunger when said solenoid means is energized.

References Cited in the file of this patent

UNITED STATES PATENTS

| | | |
|---|---|---|
| 937,122 | Waterman | Oct. 19, 1909 |
| 2,321,095 | Mantz | June 8, 1943 |
| 2,652,065 | Kuntzler | Sept. 15, 1953 |
| 2,656,983 | Grayson | Oct. 27, 1953 |